United States Patent
Singh et al.

(10) Patent No.: US 7,155,462 B1
(45) Date of Patent: Dec. 26, 2006

(54) METHOD AND APPARATUS ENABLING MIGRATION OF CLIENTS TO A SPECIFIC VERSION OF A SERVER-HOSTED APPLICATION, WHERE MULTIPLE SOFTWARE VERSIONS OF THE SERVER-HOSTED APPLICATION ARE INSTALLED ON A NETWORK

(75) Inventors: Shaiwal Singh, Kirkland, WA (US); William D. Devlin, Sammamish, WA (US); John Eric Gilbert, Sammamish, WA (US); Dave Tamasi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 634 days.

(21) Appl. No.: 10/062,944

(22) Filed: Feb. 1, 2002

(51) Int. Cl.
*G06F 17/30* (2006.01)
(52) U.S. Cl. ........................................ 707/203; 707/10
(58) Field of Classification Search .............. 707/1–10, 707/100–104.1, 200–205; 709/223, 226
See application file for complete search history.

(56) References Cited

U.S. PATENT DOCUMENTS

| 6,044,367 | A | * | 3/2000 | Wolff | 707/2 |
| 2002/0103907 | A1 | * | 8/2002 | Peterson | 709/226 |
| 2004/0249927 | A1 | * | 12/2004 | Pezutti | 709/223 |

* cited by examiner

*Primary Examiner*—Mohammad Ali
(74) *Attorney, Agent, or Firm*—Ronald M. Anderson

(57) ABSTRACT

A method and apparatus enabling migration of clients to a specific version of a server-hosted application, where multiple software versions of the server-hosted application are installed on the network, such that clients using the application experience minimal downtime related to upgrades and revisions of the application. When a new version of the application is to be deployed, a selected small portion of the clients is directed to the new version, to verify the functionality of that version, while the remaining clients use the previous version. If problems are discovered in the new version, the upgrade is terminated without impacting all of the clients. A register retains the identity of the clients and the version of the software with which each client is associated. The direction of the selected portion of clients to the new version of the software is done in a manner that can be completely transparent to the clients.

48 Claims, 8 Drawing Sheets

METHOD AND APPARATUS ENABLING MIGRATION OF CLIENTS TO A SPECIFIC VERSION OF A SERVER-HOSTED APPLICATION, WHERE MULTIPLE SOFTWARE VERSIONS OF THE SERVER-HOSTED APPLICATION ARE INSTALLED ON A NETWORK

FIELD OF THE INVENTION

The present invention generally relates to the release of a new version of a multi-tiered Web hosted application on a network concurrently with a previous version, and more specifically, relates to enabling a select group of network clients to be directed to a specific version of an application, while simultaneously directing other clients to other versions of the application in a manner that can be transparent to all of the network clients.

BACKGROUND OF THE INVENTION

In response to the needs of the software market, software developers are continually at work developing new versions of software having increased capabilities and functionality. Most software developers regularly offer upgrades to their product lines to stimulate further sales and interest among their customers. Users are motivated to upgrade to obtain access to the enhanced functionality and capabilities. Upgrades are also sometimes directed at correcting errors or "bugs" in a prior version of the software. For individual users of software who typically install a specific version of a software product on a computing device, the decision of whether to upgrade to a newer version of the software may be made as a matter of personal preference.

However, in a networked environment, the individual software users are often not in a position to determine the software version that is executed on their computing device. Furthermore, in such a networked environment, any errors or loss of functionality associated with upgrading from one version to a different version is not isolated to a single computing device and user, but instead will typically affect each network client that uses the software being upgraded.

Most updates to complex multi-tiered web hosted applications require the following steps:
 bring down the whole application (thereby preventing clients from accessing the application);
 update the software;
 migrate all data to the new version of the software; and
 restart the application (thereby enabling clients to access the application).

This procedure can be tedious, especially when the amount of application specific data stored is large, and/or when the software is complex, which is often the case for applications used in a network environment. Furthermore, the updating and migration processes described above are quite error prone, and it is generally not a simple task to return to the last good configuration of software and client data if an error in a newer version of the software is discovered. These problems can all too easily result in significant downtime for network clients.

While new versions of software are generally rigorously tested prior to being released for a general upgrade installation, not all errors will likely be detected during pre-release testing. Even when a new version of software is relatively error free, the time required to migrate all data into a new format used by the new version can be so significant as to result in an undesirably long interruption of service provided by the software on the network. Particularly for commercial ventures, such lengthy downtimes are preferably avoided.

It would thus be desirable to provide networks with the ability to install multiple versions (i.e., an existing and a new version) of software side-by-side, to verify the functionality of the new version of the software using a selected portion of the network clients, while the remaining portion of the network clients continue to be serviced by one or more previous versions of the software. Thus, if problems are discovered relating to the new version of software, the upgrade might then be halted without adversely impacting all of the network clients. Preferably, only a small portion of network clients should be enabled to access the new version of the software until that version of the software is proven robust and generally error free. It would also be desirable for such upgrading and simultaneous functioning of multiple software versions to occur in a manner that is transparent to network clients, and minimizes downtime experienced by network clients.

SUMMARY OF THE INVENTION

The present invention enables the release of multi-tiered web-hosted application software to take place without disrupting existing versions of the application. When a new version of a hosted application needs to be installed on a network server, it is installed and the previous version of the hosted application remains on the network. The majority of network clients that currently have access to the hosted application are unaffected by the installation of the newly installed version, because they continue to be served by the previous version of the hosted application.

Once the new version of the software has been tested in isolation, the system administrator installs the new version of the software on the system, so the new version is available to service actual application clients. The system administrator then identifies a selected portion of the network clients that currently have access to the hosted application, and the selected portion is configured to have access to the newly installed version of the hosted application. The data for the selected portion of the network clients is also migrated to the newly installed version of the hosted application. The activity of the selected portion of network clients is monitored to ensure that the newly installed version of the hosted application is functioning properly. By selecting a relatively small percentage of all network clients having access to the hosted application to be included in the selected portion, even if the newly installed version of the hosted application fails to perform satisfactorily, the majority of the network clients having access to the hosted application will still be serviced by the previous version. Furthermore, some or all of the selected network clients identified by the administrator can be specially selected beta testers who are responsible for testing the newly installed version. Accordingly, the upgrade is executed with minimal disruption of service to the network clients.

Preferably a portion of the server includes a client database that stores meta information related to each network client having access to the hosted application in a register, including an indication of the version of the hosted application with which each client is associated, and an indication of the status of the client. When the system administrator wishes to make the new application version available to a specific client, the data relating to that client in the client database are changed to reflect that the selected client is associated with the newly installed version of the hosted application, and to indicate that the client's status is in a "migrating" state. The "migrating" state indicates that data unique to that client are being reformatted to be compatible with the newly installed version of the hosted application. While such reformatting can generally be accomplished rapidly, if a client has a large volume of data, the process can take several minutes. During that time, if that client attempts to access the data, a message will be displayed to the client indicating that the hosted application is temporarily unavailable. It should be noted that clients attempting to access data that are being migrated could be handled in alternative manners. For example, the client could be provided read-only access to the data as it existed before the migration. The client could be provided read-write access to subsets of the data. The request from a client can even be queued until the data is completely migrated, and then a response could be generated using the migrated data. Once the data have been properly migrated, the status of the client is changed to an "active" state, and the client can utilize the newly installed version of the hosted application. While it is true that in some embodiments that the hosted application is unavailable to a client when that client's data are being migrated, the data migration for a small group of clients can be accomplished much more rapidly than migrating data for all of the clients at once. Indeed, if only a small selected group of clients is being upgraded to the new version, and if only small amounts of data must be converted, a client may experience such a minor delay that the client would assume the delay is due to network traffic, rather than due to the upgrading of the hosted application. While one group of clients is being migrated to the new application version, other clients are unaffected by this process, and therefore experience no interruption in service, because they continue to use the existing application version. Thus, the present invention provides for little or no interruption of service. The present invention also provides a framework for further innovation to allow for more seamless upgrades, by reducing the problem to that of upgrading individual clients. The upgrade of individual clients is very application dependent, and as such improving the upgrading (or migrating) of individual clients is often a function of the technologies employed in a specific application.

After a period of time elapses, and the functionality of the newly installed version of the hosted application appears satisfactory, other selected groups of clients can be migrated to the newly installed version. Once all clients have been successfully migrated, the prior version of the hosted application can optionally be removed from the network. The above process preferably takes place in a manner that is transparent to the client. For each client, interruption of service is limited to the time required to migrate that client's data. Therefore the perceived downtime (if any), with respect to any single client, remains constant regardless of the total number of clients which will be migrated to the new version. Furthermore, only those clients who actually attempt to access the hosted application during that brief time period in which their data is being migrated will encounter any downtime. Many clients will encounter no downtime at all, because their data will have been migrated in a time period that does not correspond to that client's use of the hosted application.

When multiple versions of a hosted application reside on a network and a client attempts to access the hosted application, a server accessing the application must determine the version of the hosted application that is associated with that client. One mechanism for determining the version associated with the client is to refer to the client database each time a client attempts to access the server-hosted application. When the server and client communicate using Hypertext Transport Protocol (HTTP), the server will preferably examine the HTTP request from a client to determine if the request includes a reference to the version of the hosted application with which the client is associated. Also, the server will preferably include a reference to the version of the hosted application with which the client is associated in a cookie. If no such indication is found by the server, the client database is consulted, and the server then incorporates the appropriate version in a cookie, so that the database does not need to be consulted the next time that the client accesses the hosted application. If a conflict ever arises between a version referenced by such a cookie and the client database, the version specified in the client database takes precedence. This situation can arise if the client has been migrated from one version to another version since that client's last visit. This mechanism for caching the version of the software to use for a client in cookies is preferred, because it significantly enhances the performance of the hosted application. While embodiments that do not incorporate such a mechanism are functional, it is likely that the performance of such embodiments will not be as good as embodiments that incorporate caching, because without such caching the hosted application will need to utilize system resources to verify which version of the hosted application is associated with a specific client.

When a new client attempts to access the hosted application for a first time, that client will be associated with a default version of the hosted application as defined by a system administrator. The default version and its association with the new client are added to the client database, and if possible, the default version is added to a cookie as described above. As hosted versions change, the system administrator can define a new default version.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

Figure 6:
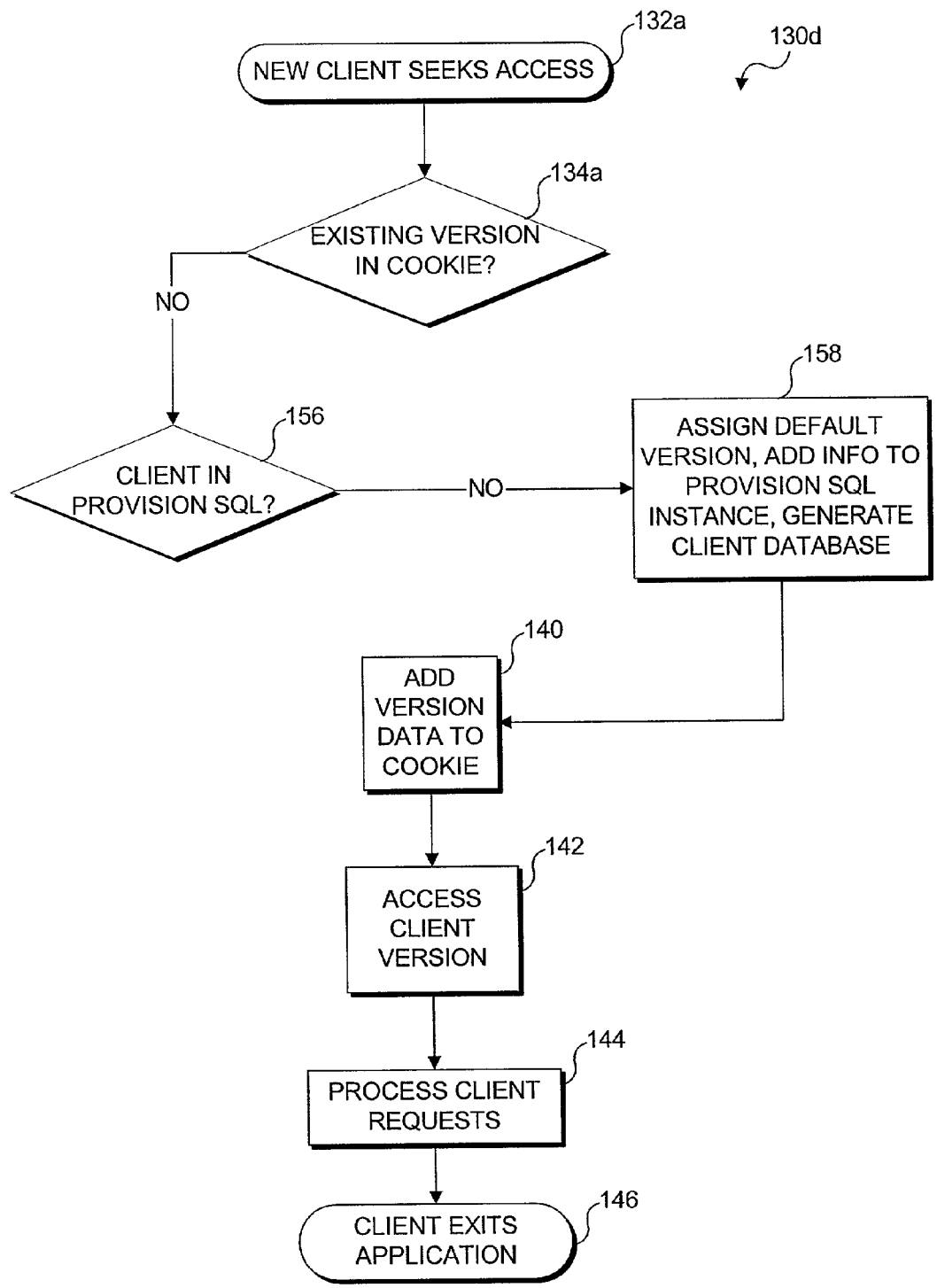
Figure 7:
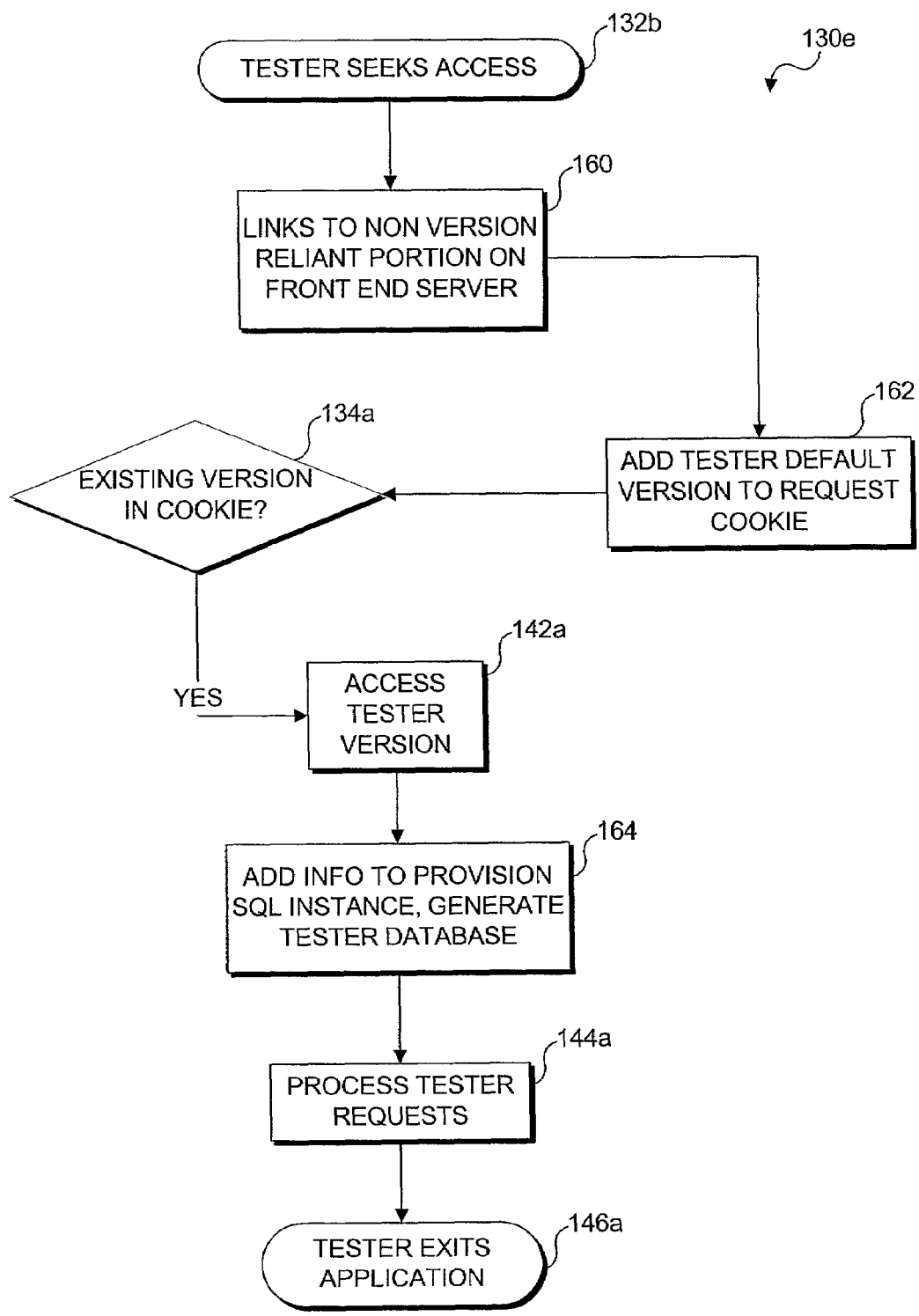

FIG. 6 is a flow chart diagram illustrating the logical steps implemented in accord with the present invention when a new client seeks access to a server-hosted application, if more than one version of that server-hosted application resides on the server; and FIG. 7 is a flow chart diagram illustrating the logical steps implemented in accord with the present invention when a tester seeks access to a server-hosted application, if more than one version of that server-hosted application resides on the server.

DESCRIPTION OF THE PREFERRED EMBODIMENT

Exemplary Operating Environment

Figure 1:
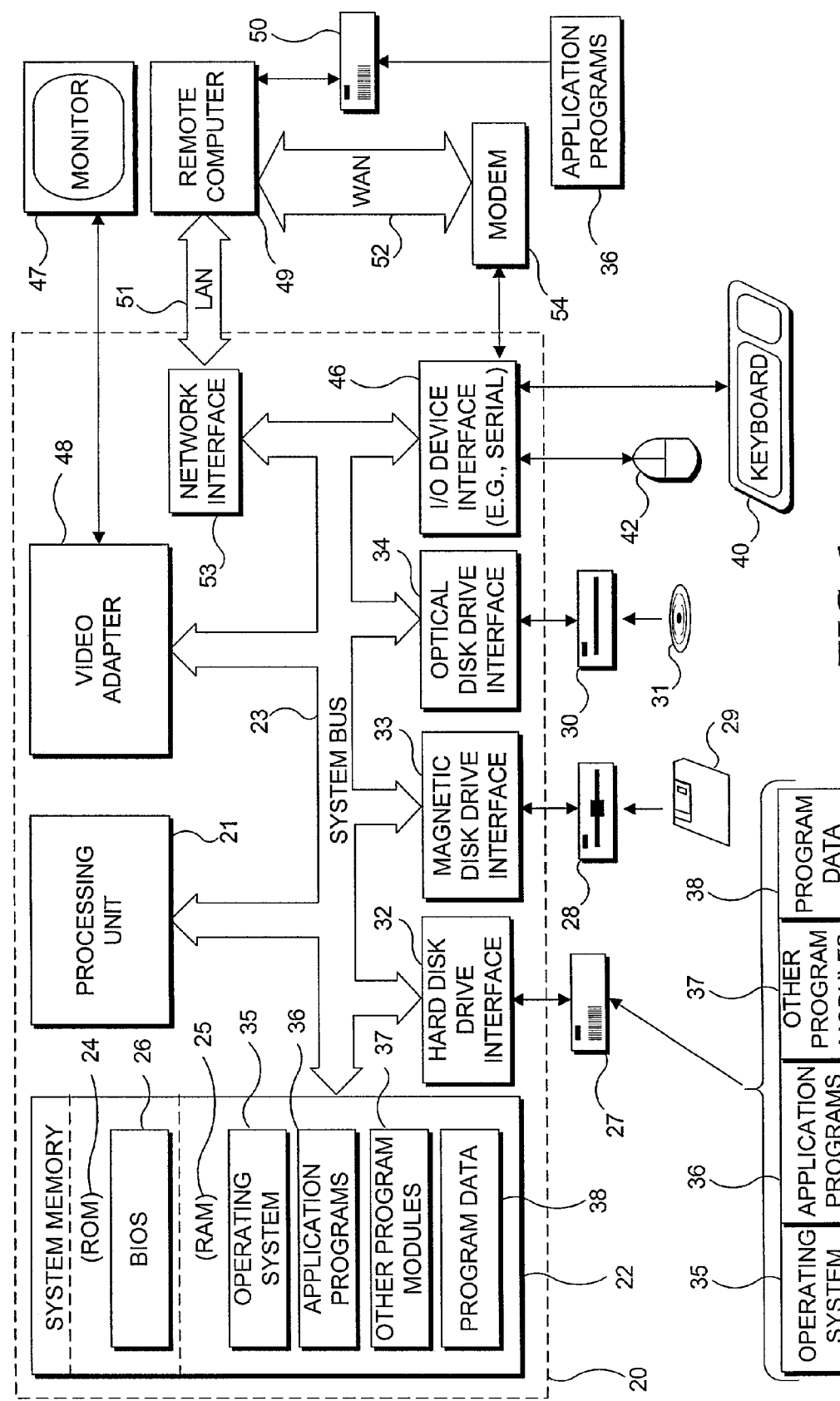
FIG. 1 is a block diagram of an exemplary system for implementing the present invention using a general purpose computing device in the form of a conventional server computer.

FIG. 1 and the following discussion related thereto are intended to provide a brief, general description of a suitable computing environment in which the present invention may be implemented. This invention is preferably practiced using one or more computing devices functioning as a server, which are coupled to a client computing device or other remote computing device by a communications network. The client computing device will also typically include the functional components shown in FIG. 1. Although not required, the present invention is described as employing computer executable instructions, such as program modules that are executed by the server to enable localization of application specific functionality by a client computer or computing device. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to the client device, including handheld devices, pocket personal computing devices, digital cell phones adapted to execute application programs and to wirelessly connect to a network, other microprocessor-based or programmable consumer electronic devices, multiprocessor systems, network personal computers, minicomputers, mainframe computers, and the like. As indicated, the present invention may also be practiced in distributed computing environments, where tasks are performed by one or more servers in communication with remote processing devices that are linked through a communications network. In a distributed computing environment, program modules may be located in both local and remote memory storage devices.

With reference to FIG. 1, an exemplary system for implementing the present invention includes a general purpose computing device in the form of a conventional server 20 that is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26 containing the basic routines that are employed to transfer information between elements within server 20, such as during start up, is stored in ROM 24. Server 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for server 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks (DVDs), Bernoulli cartridges, RAMs, ROMs, and the like, may also be used in the exemplary operating environment.

A number of program modules may be stored on the hard disk, magnetic disk 29, optical disk 31, or in ROM 24 or RAM 25, including an operating system 35, one or more application programs 36, other program modules 37, and program data 38. A user may enter commands and information into server 20 through input devices such as a keyboard 40 and a pointing device 42. Other input devices (not shown) may include a microphone, joystick, game pad, satellite dish, scanner, or the like. These and other input/output (I/O) devices are often connected to processing unit 21 through an I/O interface 46 that is coupled to system bus 23. The term I/O interface is intended to encompass interfaces specifically used for a serial port, a parallel port, a game port, a keyboard port, and/or a universal serial bus (USB), and other types of data ports. A monitor 47, or other type of display device, is also connected to system bus 23 via an appropriate interface, such as a video adapter 48, and is usable to display application programs, Web pages, and/or other information. In addition to the monitor, the server may be coupled to other peripheral output devices (not shown), such as speakers (through a sound card or other audio interface, not separately shown), and printers.

As indicated above, many aspects of the present invention are preferably practiced on a single machine functioning as a server; however, server 20 will normally operate in a networked environment using logical connections to one or more remote computers, such as a remote computer 49. Remote computer 49 may be another server, a client personal computer, a router, a network PC, a peer device, or a satellite or other common network node, and typically includes many or all of the elements described above in connection with server 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and the Internet.

When used in a LAN networking environment, server 20 is connected to LAN 51 through a network interface or adapter 53. When used in a WAN networking environment, server 20 typically includes a modem 54, or other means such as a cable modem, Digital Subscriber Line (DSL) interface, or an Integrated Service Digital Network (ISDN) interface, for establishing communications over WAN 52, which may be a private network or the Internet. Modem 54, which may be internal or external, is connected to the system bus 23 or coupled to the bus via I/O device interface 46; i.e., through a serial port. In a networked environment, program modules depicted relative to server 20, or portions thereof, may be stored in the remote memory storage device. It will be appreciated that the network connections shown are exemplary and other means of establishing a communications link between the computers may be used, such as wireless communication and wideband network links.

Exemplary Embodiment

A preferred embodiment of the present invention is to be incorporated into Microsoft Corporation's bCentral™ website and will initially be employed to enable managers of the website to simultaneously provide multiple versions of the FINANCE MANAGER™ application to Internet clients. The multiple versions of the FINANCE MANAGER application will function in a manner that is transparent to the Internet clients of the application, in that the clients will have no indication that they are accessing any particular version of the FINANCE MANAGER application. Only when a new version includes additional features or modified graphics would a client recognize that a different version of FINANCE MANAGER is being accessed.

The managers of the website will preferably select a small percentage of the clients of the application, and divert those selected clients to a new version of FINANCE MANAGER, while the non selected clients will still access the existing version of FINANCE MANAGER. The website managers will closely monitor the functionality of the newer version of FINANCE MANAGER, to determine if the newer version should completely replace the existing version. Once such a decision is made, the entire client base will be diverted over to the newest version of FINANCE MANAGER. Once all clients had been diverted to the new version, the prior version will be removed. Preferably, from a client point of view, this process will not be noticeable, unless new features are provided by the upgraded version of FINANCE MANAGER.

While the exemplary embodiment, described in greater detail below, is disclosed in regard to the FINANCE MANAGER application, it is not intended that the invention be limited to any specific application, since it can be clearly applied to other types of applications, and it is anticipated that the present invention will be utilized with other bCentral™ properties. It should further be understood that the present invention is neither limited to a specific website, nor to any specific type of network, since it clearly can be applied to other Internet/Intranet websites, and other types of networks. Furthermore, while it is likely that only two versions of software will be run simultaneously (an existing version and new or upgrade version), it should be understood that, in accord with the present invention, more than two versions of a software application can be hosted at a network site at any one time.

Before explaining how the present invention is implemented, it will be helpful to define several terms. The term "Structured Query Language" (SQL) as used herein and in the claims that follow refers to a language used to interrogate and process data in a relational database. Originally developed by IBM for its mainframes, all database systems designed for client/sever environments support SQL. SQL commands can be used to interactively work with a database or can be embedded within a programming language to interface to a database.

Some of the major database management systems (DBMSs) that support SQL are Microsoft SQL Server, DB2™, SQL/DS™, Oracle™, Sybase™, SQL base™, INFORMIX™, and CA-OpenIngres™ (Ingres). As an example, the following SQL query selects customers with credit limits of at least $5,000 and puts them into sequence from highest credit limit to lowest. The words in bold font are SQL verbs.

SELECT NAME, CITY, STATE, ZIPCODE
FROM CUSTOMER
WHERE CREDITLIMIT>4999
ORDER BY CREDITLIMIT DESC

The term "server" refers to a computer in a network that is shared by multiple clients, and as used herein, refers either just to the software that performs the service, or to both the hardware and software. For example, a Web server may refer to the Web server software in a computer that also runs other applications, or it may refer to a computer system dedicated only to the Web server application.

The term "client" refers to a computer or computing device in a network that an individual client utilizes to access data or applications from one or more servers. Such client/server architecture exists in various networked systems, such as legacy systems, WANs, LANs, intranets, and the Internet.

In a very simple form, a server can be merely a file server, that acts as a remote storage device, and most or all processing is executed by the client. This is sometimes referred to as a non-client/server system. Lengthy searches can bog down such a network, because each client has to read the entire contents of the file server. In a two-tier client/server, the application and database processing are executed by the server. An SQL request is generated by the client and transmitted to the server. For database searches, the server returns only matching records to the client. In a three-tier client/server, the processing is divided between two or more servers, one typically used for application processing and another for database processing. This architecture is common in large enterprises. Because of the Internet, terms such as "Web based" and "Web enabled" have often replaced the client/server language, yet the client/server architecture is conceptually the same.

The term Hyper Text Transport Protocol (HTTP) refers to the communications protocol used to connect to servers on the World Wide Web. Its primary function is to establish a connection with a Web server and transmit HTML pages to the client browser. Addresses of Web sites begin with an http:// or an https:// prefix; however, Web browsers typically default to the HTTP protocol. For example, typing "www. " followed by the characters required to connect with a desired uniform resource locator (URL) produces the same effect as typing "http://" followed by "www" followed by the characters required to connect with the desired URL.

The term "cookie" refers to data created by a Web server that is stored on a client's computer. Such data provide a way for a Web site to keep track of a client's patterns and preferences and, with the cooperation of a Web browser, to store them on the client's own computer. Such cookies contain a range of URLs (addresses) for which they are valid. When a browser encounters those URLs again, it sends those specific cookies to the Web server. For example, if a client's ID was stored as a cookie, that client would not have to input the same information again when subsequently accessing that Web server. Client's can selectively disable cookies; thus, not all requests from clients will include such cookies.

Figure 2A:
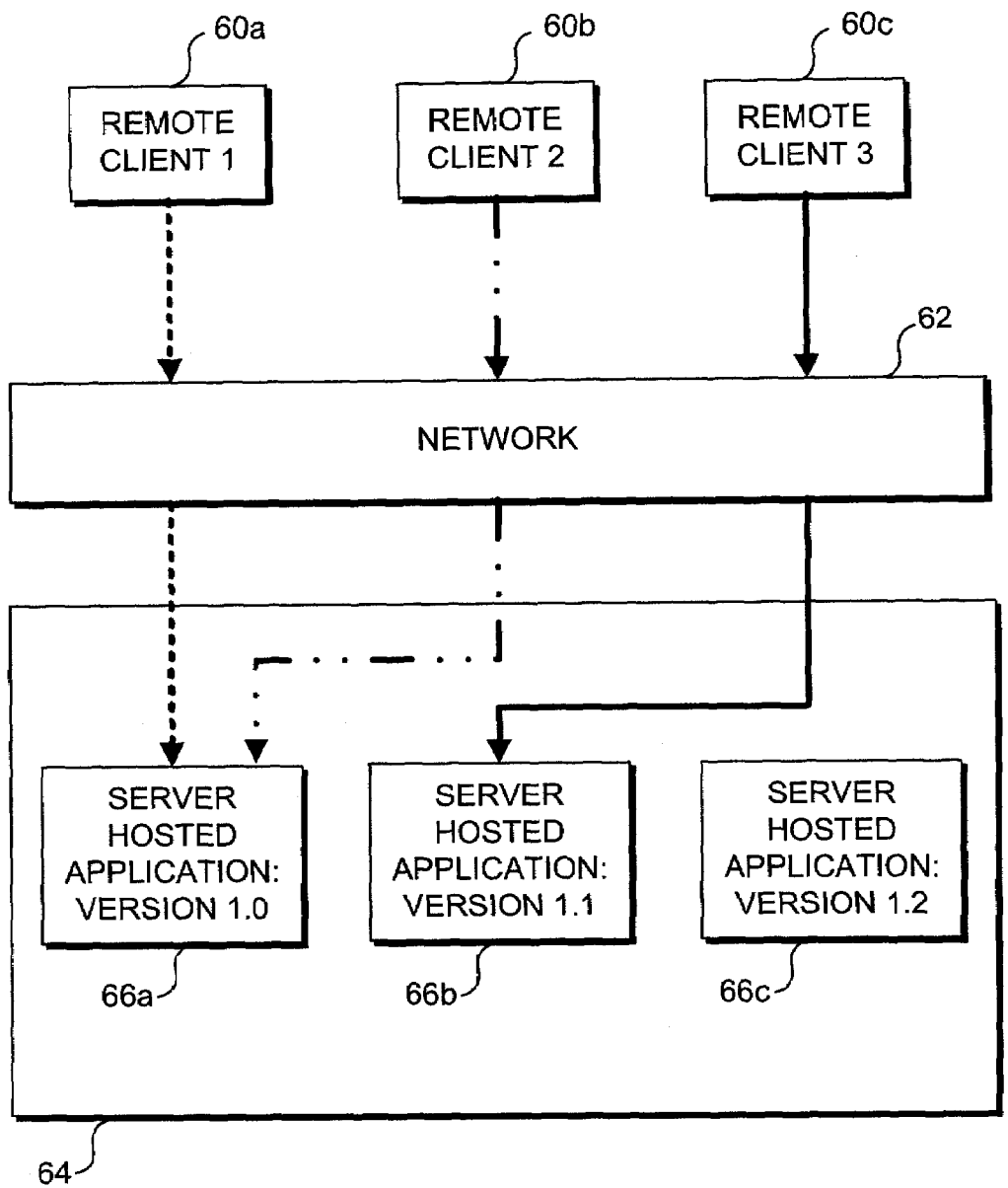
FIGS. 2A and 2B are block diagrams of exemplary components employed for implementing the present invention in a network environment.
Figure 2B:
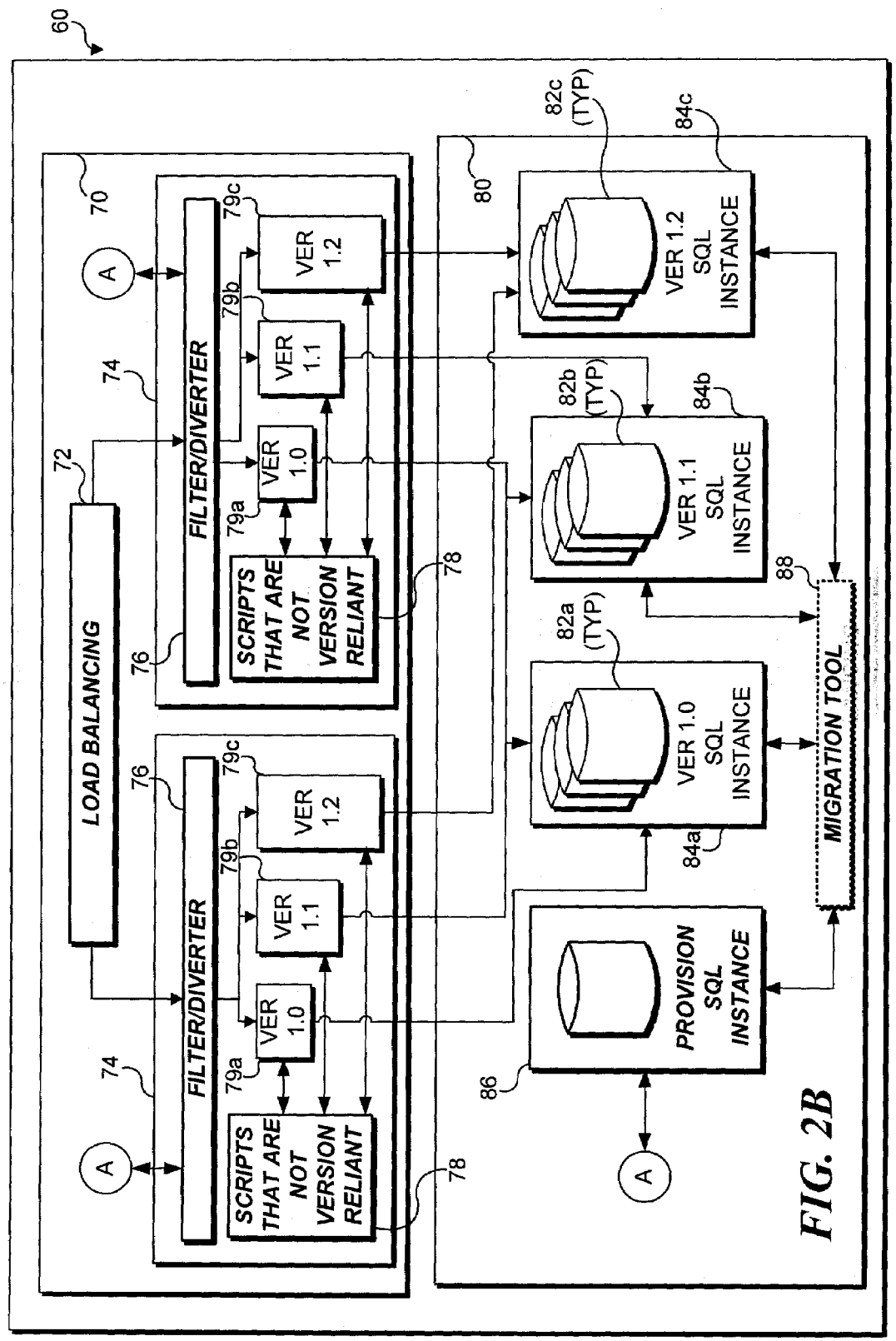

FIG. 2 illustrates an architecture for a preferred embodiment of the present invention. A system 60 includes a front end tier 70 that preferably employs Microsoft Corporation's IIS™ (Internet Information Server) web server, and a back end tier 80 that utilizes Microsoft Corporation's SQL Server™ 2000 program. Those of ordinary skill in the art will recognize that the use of other configurations (such as a single tier, or the use of highly available clusters) and other server applications are not only possible, but also contemplated. Accordingly, the present invention is not limited to a two-tiered configuration, or to specific server management applications.

In FIG. 2A, clients 60a–60c of a server-hosted application (such as FINANCE MANAGER) access a server 64 via a network 62. Server 64 (which, as discussed in greater detail below, can be implemented as more than one server) simultaneously hosts a plurality of different versions of the server-hosted application (i.e., versions 66a, 66b, and 66c, respectively corresponding to Version 1.0, Version 1.1, and Version 1.2, where the versions are intended to be exemplary, rather than limiting). When accessing the server-hosted application, server 64 selectively directs clients 60a and 60b to version 66a (i.e., Version 1.0), but directs client 66c to version 66b (i.e., Version 1.1). As noted above, once it is clear that Version 1.1 is working well, clients 60a and 60b can be migrated to Version 1.1. Version 1.2 is not being utilized in this scenario; it has been included simply to indicate that more than two versions can be simultaneously hosted.

As shown in FIG. 2, front end tier 70 includes a load balancing component 72 that distributes communications with incoming clients among two or more servers 74. Those of ordinary skill in the art will understand that while such load balancing is a useful feature, it is not critical to the functionality of the present invention and can be omitted. Furthermore, multiple servers are not required, as the present invention can be achieved on a single server (and/or a single tier). Each server 74 maintains the forms and scripts of the application. Preferably, the forms encapsulate the client interface for the application, and the scripts contain part of the business logic for the application. The forms and scripts are grouped together in an IIS Virtual Directory. More specifically, those forms and scripts that are not dependent upon a particular version of the software application reside in a virtual directory 78. Forms and scripts that are reliant upon a particular software version reside in virtual directories 79a–79c, each of which is associated within a particular software version number. Thus, virtual directory 79a stores scripts and forms required by software version 1.0; virtual directory 79b stores scripts and forms required by software version 1.1; and, virtual directory 79c stores scripts and forms required by software version 1.2. The group of virtual directories 78 and 79a–79c form a logical virtual directory.

Key elements of the present invention are filters/diverters 76, a single filter/diverter residing on each front end tier server 74. In a preferred embodiment, filters/diverters 76 are realized as an IIS ISAPI filter (a web request filter) that directs the client request to a specific virtual directory 79a–79c, depending on the software version number in the context of the request. In the preferred embodiment, the filter will determine if a cookie included in the request for access by a client references a particular version associated with that client. If so, that client is directed to the specific version of the application. If no reference to the software version is included as a cookie in the client request (note that the software version selection process is preferably independent of the client, i.e., the client is not affirmatively interrogated to determine the software version that is to be accessed), then a provision SQL Instance 86 is consulted to determine the software version to which the client should be directed. Rather than looking for the appropriate software version in a cookie, provision SQL Instance 86 could instead be consulted. It is anticipated, however, that performance will be enhanced if not all client requests require consulting provision SQL Instance 86. As noted above, the present invention is not limited to use in conjunction with the Internet. For networked systems that do not support cookies, and for client requests that do not include version data within a cookie, filters/diverters 76 will consult provision SQL Instance 86 to determine software version to which the client should be directed. Further details of filters/diverters 76 are provided below.

Back end tier 80 maintains all of the financial data records for FINANCE MANAGER clients. Each client's data are preferably separated into individual SQL Server client databases 82a–82c to isolate and secure one client's data from another client's data. In addition, client databases 82a–82c also may contain partial business logic for the application. Client databases 82a–82c are grouped together into SQL Server instances. All of the client databases in a specific SQL Server instance are at the same software version number. Thus, as illustrated in FIG. 2, client databases 82a are grouped together in an SQL instance 84a correlating to version 1.0, client databases 82b are grouped together in an SQL instance 84b correlating to version 1.1, and client databases 82c are grouped together in an SQL instance 84c correlating to version 1.2. While not shown in FIG. 2, it should be noted that client databases associated with a specific software version can be distributed over more than one SQL instance. This type of distribution is particularly likely to happen for an existing or older version of a software application, as it is preferred that the bulk of the network clients use an existing version of the software application, while a small percentage of the network clients are directed to a newer version of the software application.

Back end tier 80 further includes a special SQL Instance, referred to as provision Instance 86, which hosts a database called the provision database. The provision database maintains a table that records each client's identity (ID), the client's database name, the SQL instance, where the client's database is located, the software version that the client's database is running, and the status of the client. The provision database can thus be considered to maintain meta information about clients that can be used to migrate client databases from one software version format to another. In addition to the meta information about clients, the provision database also stores the value of the default software version number. This version number preferably specifies the software version number to use when provisioning a new client. Both the provision SQL instance and client SQL instances can be made highly available by employing clustering technologies.

Software revision independent components of FIG. 2 are indicated by bold block, and bold/italicized text. Such components include load balancing component 72, filters/diverters 76, virtual directories 78, and provision SQL Instance 86. The software revision specific components are the version specific virtual directories 79a–79c, and the version specific SQL Instances 84a–84c. In addition to the aforementioned components, the architecture preferably contains a migration tool 88 that is used to migrate a client database from one software version to another. This migration tool allows easy plug-in of migration logic for a particular start version number to a particular end version number. For example, assume that software version 1.2 has been used for a sufficiently long period of time that the system manager determines that software versions 1.0 and 1.1 are no longer required. Client data residing in SQL Instances 84a (data compatible with version 1.0) and 84b (data compatible with version 1.1) can be manipulated by migration tool 88 such that the client data is compatible with version 1.2. Once all client related data is converted to version 1.2, software versions 1.0 and 1.1 are no longer required, and can be removed from both front end tier 70 and back end tier 80 if desired.

A key feature of the present invention is the side-by-side deployment of multiple software versions of a server-hosted application in a manner that is transparent to network clients. The intent is to enable a manager of a hosted application to upgrade or revise the application with minimal downtime and minimal impact to clients, and to enable flexible live site upgrade.

Figure 3:
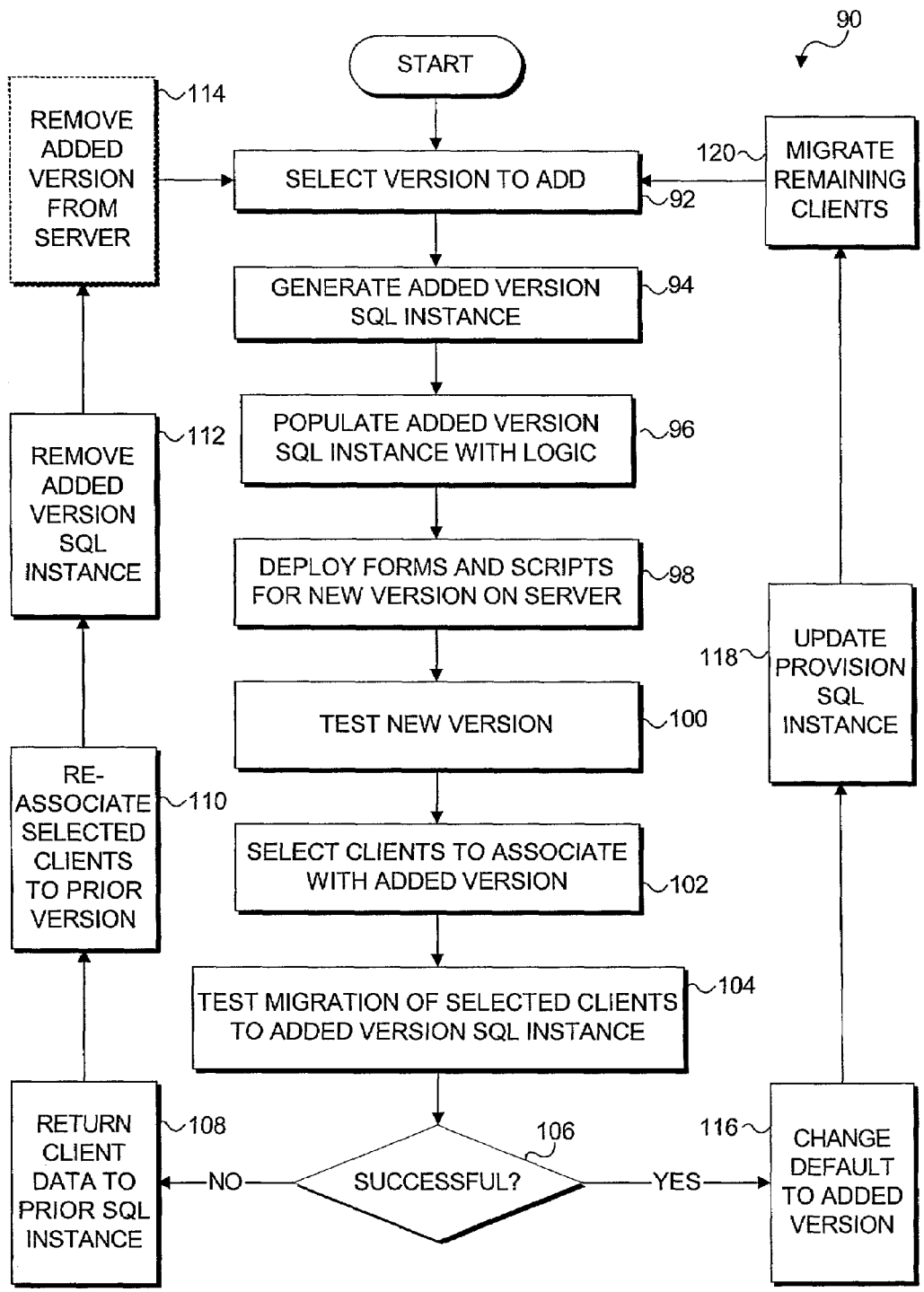
FIG. 3 is a flow chart diagram illustrating the logical steps implemented to add a different version of a server-hosted application to the server, in accord with the present invention.

For example, in the context of FIGS. 2 and 3, assume that system 60 originally contains a deployment of Version 1.0 of the application software. The system manager desires to deploy Version 1.1 (or some other version), as indicated in a block 92 in a flowchart 90, which is shown in FIG. 3. If this is a new version, the new version will be registered in provision SQL Instance 86 of FIG. 2. In a block 94, an SQL Instance is generated for the added version (see SQL Instances 84*a* and 84*b* of FIG. 2) within the back-end tier. The next step described in a block 96 is to populate the added SQL Instance (such as SQL Instance 84*b* of FIG. 2, for Version 1.1) with application business logic corresponding to the selected version. Then, in a block 98, the appropriate forms and scripts for the added version are added to the front-end tier servers (see virtual directories 79*b* of servers 74 in FIG. 2, into which forms and scripts for Version 1.1 have been added). While in the preferred embodiment, multiple servers, a front end tier, and a back end tier are described, the present invention does not require such elements. Thus, in a different networked environment where an application resides on a single server, steps 94–98 would be combined into a single step of adding the selected new version to the server.

Referring once again to FIG. 3, the newly added version is tested in a block 100. While such a testing step is not strictly necessary, since the software version would preferably have passed testing before the system manager decides to add it, the risk of interrupting service to network clients by failing to perform such testing before allowing network clients access to a newly added version of a hosted application is generally not considered prudent. In a block 102, the system manager selects a portion of the network clients who have access to the hosted application, who will be diverted to the newly added version of the hosted application. Preferably, the selected portion represents a relatively small overall percentage of the network clients that have access to the hosted application, so that in the event of a failure or problem occurring in the newly installed version of the application, relatively few of the network clients are affected. The specific size of the selected portion is not critical; however, a key feature of the present invention is that all network clients having access to the hosted application are not migrated in a single step (as was normally done in the prior art, by taking the hosted application completely offline during an upgrade process). If the selected portion is excessively small, and each selected portion thereafter is similarly small, it will likely take an undesirably long time to migrate all clients to the new version. However, if the selected portion is excessively large, any problems or failures encountered during the upgrade will affect too many clients, eliminating the significant improvement in the upgrade process provided by the present invention over the prior art. Preferably, the selected portion should be no more than one-third of all network users having access to the hosted application, and no less than 5%. More preferably, the selected portion should be about 10% of the network users having access to the hosted application. In block 102, the selected clients are associated with the newly added version of the hosted application by updating the information relating to the selected clients and the associated version that resides in provision SQL Instance 86 of FIG. 2.

In a block 104, data relating to those selected clients are migrated from their prior SQL Instance to the SQL Instance corresponding to the newly added version. For example, in regards to FIG. 2, client data from SQL Instance 84*a* (Version 1.0) would be migrated to SQL Instance 84*b*, if the newly added version is Version 1.1. Note that even though a block of clients will likely have been selected to participate in this test migration, each client is actually migrated individually. That is, if a group of 10 clients are selected to participate in a test migration, what occurs is that first one of those clients will have their data migrated to be compatible with the new version of the software, then a second client's data would be migrated, and so on, until the data for all 10 clients had been migrated. In block 104, several processes are occurring. For each client that is migrated, provision SQL 86 is updated with the new version that is associated with that client, data associated with that client is migrated to a different SQL Instance (this may involve converting the data into a format that is compatible with the new software version).

Once the migration of block 104 is complete, the system manager will perform testing to ensure that the newly installed version and the migrated data function as expected. This testing preferably involves monitoring the selected clients as they access the hosted application for a period of time, to determine that proper functionality is provided to the selected clients. For a hosted application that has a high level of use, this testing time period can be relatively short. If some or all of the selected clients represent clients who are under the active control of the administrator of the hosted application (i.e. testers), the administrator (or the administrators designee) can actively access the hosted application as one or more of the selected clients, thereby performing a testing function without waiting for normal network traffic to bring one of the selected clients to the hosted application.

Once the administrator of the hosted application is satisfied that sufficient testing has occurred, a decision is made as to whether the recently installed version of the hosted application functions as desired, as shown in a decision block 106. If it is determined that the newly added version is not acceptable, then, in a block 108, the migrated client data are returned to the original configuration and SQL Instance.

Decision block 106 will be determining if a migration has been successful at several levels. While it is possible that in decision block 106 it might be determined that the newly installed version is so flawed that it must be removed entirely from the system, it is more likely that errors have occurred in the conversion of client data from a prior version to the newly installed version. Such errors don't require the removal of the new version from the system, but rather require correcting the error in the data conversion. This can be effected by "rolling back" the entire set of migrated clients, or only rolling back those clients whose data was not correctly migrated.

Note that if it has been determined that the newly installed version is so flawed that it must be removed, then all clients migrated to the new version will need to be rolled back to the prior version, or migrated to a "fixed" version that replaces the flawed newly installed version. There are two broad categories of flaws that are likely to occur during migration. In the first category, the tool that is executing the migration fails to migrate the client data to the new version. In the second category the migration tool completes migrating the data, but the actual migrated data is flawed or corrupt.

Normally when errors of the first category occur, the client data would not need to be reverted back to the prior version, because the actual conversion to the new version format never occurred. Note that at this time, the client will not be able to access their data, because the provision SQL 86 indicates that the client is associated with the new version, but the clients data still resides in an SQL Instance associated with the prior version. Either provision SQL 86 needs to be changed to indicate the client is still associated with the prior version, or the client data in the prior version SQL Instance needs to be migrated to the SQL Instance associated with the new version. If relatively few clients in the selected group of clients being migrated experienced such a migration error, preferably an additional attempt will be made to migrate that client's data. If this type of migration error occurs frequently for a selected group, an administrator might decide to roll back all clients to the prior version, until the new version can be more thoroughly tested, or replaced with a "fixed" version.

For migration errors falling into the second category described above, such errors are usually caught during a testing phase after a batch of clients have been successfully converted to the new data format using the migration tool, which is also a function that occurs in block 106. Thus in block 106, it is determined both if data is successfully migrated (errors in either the first or second category as described above) and also whether or not the new version is functioning properly (there may be a functionality/performance problem with the new version that is not related to data migration). If during the testing in block 106 it is determined that an occasional client experienced a data migration error in which data was migrated, but not migrated properly, then generally that client's data would be rolled back to the prior version format, and the migration process would be repeated (hopefully successfully). Again, if such migration errors occur frequently, an administrator might determine that the new version was the probable cause of the errors, and thus decide to roll back all clients to the prior version, until the new version can be more thoroughly tested, or replaced with a "fixed" version.

For example, for each client whose data needs to be rolled back, Version 1.0 data originally associated with SQL Instance 84a, which was converted to Version 1.1 data and moved to SQL Instance 84b in blocks 102 and 104, would need to be converted back into the format of Version 1.0, and returned to SQL Instance 84a. In a block 110, for each client whose data was rolled back, that client must once again be associated with the previous version of the application in provision SQL Instance 86. In a block 112, for each client whose data was rolled back, the SQL Instance added in block 94, as described above, is removed. In an optional block 114, if it has been determined that the errors associated with the migration of clients from one version to a newly added version are so great that the added version must be removed, then that version is removed from the server (i.e., virtual directories 79b or 79c that were added to servers 74 in block 98 are removed). At that point, a different version can be selected when desired, and the process described above can be repeated using a new version in which the problems have been corrected. The sequence in which the steps of blocks 108–114 are performed is not critical.

Referring once again to decision block 106, if it is determined that the new version works satisfactorily, then in a block 116, the newly added version is identified as the default version. Any new clients will now be associated with the newly added version, when provisioned. Data for such newly added clients will be added to an SQL Instance corresponding to the new version, and the provision SQL Instance will record that each new client is associated with the newly added version. In a block 118, the remaining client data are migrated to an SQL Instance corresponding to the new version. In a block 120, provision SQL Instance 86 is updated so that the migrated clients are properly associated with a particular software version and a specific SQL Instance.

The provision database in provision SQL Instance 86 can also be used to prevent clients from accessing the host application as their data are being migrated. The provision database preferably includes the version associated with each client, the identity of the SQL Instance in which that client's data are stored, and the status of the client. By indicating that a client's status is "migrating," the host can prevent the client from accessing the hosted application and that client's data during the migration process. Or, as discussed above, a client's access might be limited to read only data, or subsets of their entire data set.

It should also be noted that the step of block 120 does not need to occur immediately after the new version is determined to be successful in decision block 106. More than one, or even two, different versions of a hosted application can be run simultaneously. Of course, at some point a sufficiently large number of different versions will consume so many system resources as to degrade performance to unacceptable levels. However, as illustrated in FIG. 2, it is certainly contemplated that more than two versions of a hosted application can be installed on servers 74, as virtual directories 79a–79c, relating to Versions 1.0–1.2, clearly indicate. An administrator may elect to allow a significant amount of time to elapse before executing the steps described in blocks 116–120.

Preferably, during the migration process (either of blocks 104 or 120), each individual client's database is locked down to preclude client access. As noted above, other options, such as allowing a client read only access to data, are also contemplated. In the preferred embodiment, this function is accomplished by modifying the security attributes on the SQL database (one of SQL Instance 84a–84c) that contains the client data being migrated, so as preclude a client accessing their database (one of databases 82a–82c). During migration, only administrators are allowed full access to the client databases being migrated. Note that this exclusion only effects the access of the specific clients being migrated at any one time. By migrating clients individually, the chance of any single client being denied access to their data is minimized. Preferably, the last step of the migration process is to update the software version number, the SQL Instance hosting the client's database, and the status for the client in the provision database (block 120 as described above).

During the process described in flowchart 90 of FIG. 3, there are several possible scenarios that might occur, when a client attempts to access the hosted application during the upgrade. The scenarios can broadly be categorized as follows.

A client tries to access the hosted application during the upgrade process, and their data are not being migrated.

A client tries to access the hosted application during the upgrade process, and their data are being migrated and is thus unavailable (or only available with restrictions, such as read only data, or subsets of data, as described above).

A new client tries to provision themselves with the hosted application during the upgrade process.

A new tester (i.e. a client controlled by the system manager) tries to provision themselves with the hosted application during the upgrade process.

Figure 4:
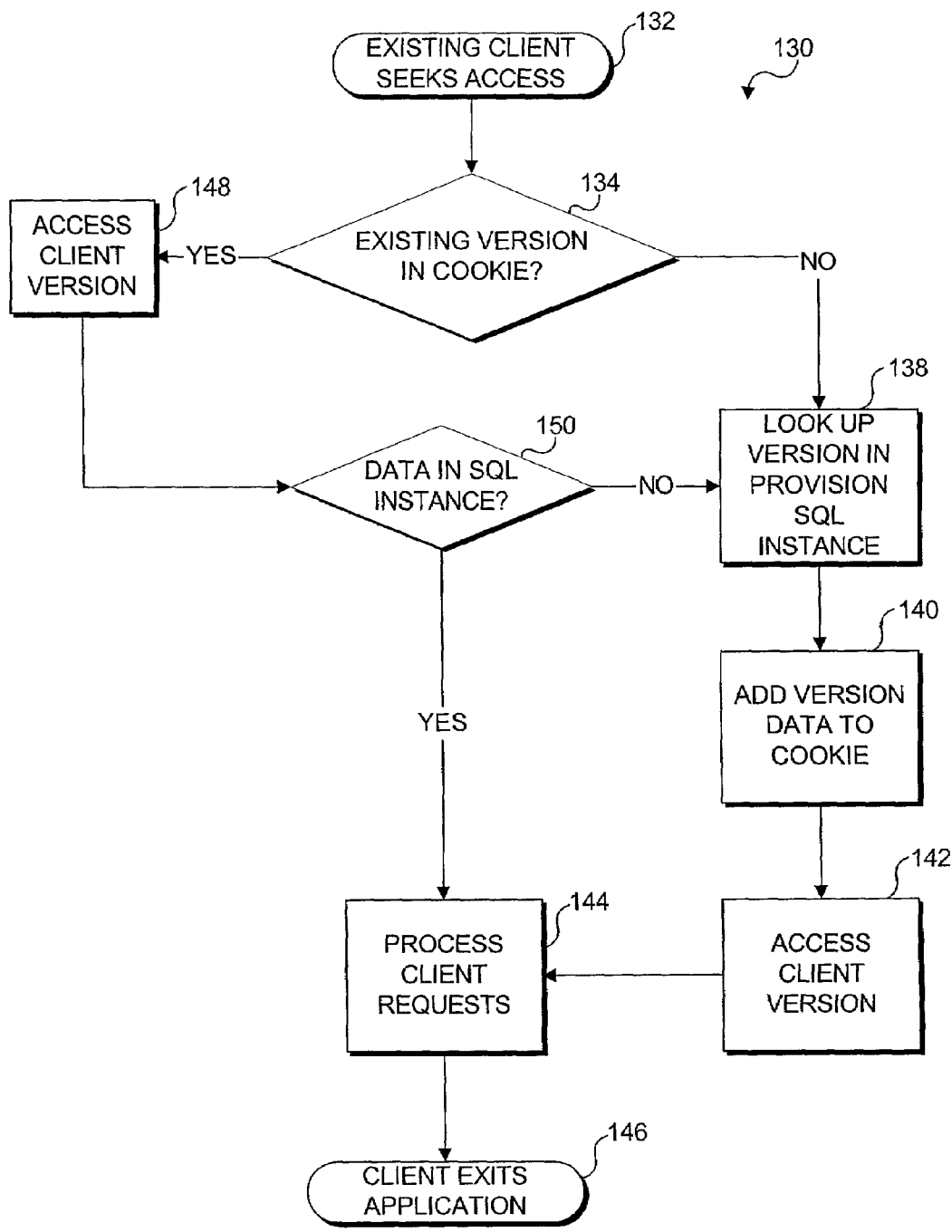
FIG. 4 is a flow chart diagram illustrating the logical steps implemented in accord with the present invention when an existing client seeks access to a server-hosted application, if more than one version of that server-hosted application resides on the server.

FIG. 4 illustrates flowchart 130, that describe the first scenario, in which an existing client tries to access the hosted application during the upgrade process, and that client's data are not being migrated. In a block 132, an existing client seeks to access the hosted application. In a decision block 134, the host determines if an existing version of the hosted application is referenced in an HTTP cookie received by the host server from the client. Checking the HTTP cookie is executed by filters/diverters 76 disposed in front end tier 70 (see FIG. 2). Such a cookie cannot merely reference any version, it must reference a version that is currently installed on the host (servers 74 as shown in FIG. 2). It is quite possible that a client who has not accessed the hosted application for a significant time might send a request that includes a reference to a version of the hosted application that is no longer supported.

If in decision block 134 it is determined the version referenced in the cookie is no longer supported by the hosted application, then in a block 138, the provision SQL Instance is consulted to determine the correct software version associated with that client (i.e., which of virtual directories 79a–79c from FIG. 2 is associated with the client). As noted above, such a situation can occur when a host has migrated a client to a different version of the hosted application after that client's last visit. Thus the cookie references the "old" version. To determine which version of the hosted application that client was migrated to, the client database (i.e. the provision SQL Instance) must be consulted. In block 138, the proper location of the client's database (i.e., the appropriate SQL Instance 34a–34c) is also determined by consulting the provision SQL Instance. Then, in a block 140, the current version of the hosted application that is associated with that client is added to the cookie, so that when that client returns to the hosted application in the future, the provision SQL Instance does not need to be consulted. Of course, if the client does not revisit the hosted application for a significant period of time, the version reference might become outdated once again. The version is written to the HTTP response headers. In a block 142, the virtual directory containing the appropriate version of the hosted application is accessed. The forms and scripts from the referenced virtual directory then run against the back end tier SQL Instance hosting the client's database (see databases 32a–32c in FIG. 2). In a block 144, the client is enabled to use the proper version of the hosted application until the client elects to exit the hosted application in a block 146.

If in decision block 134, it is determined that no version number is referenced in the HTTP request from the client (i.e., that client has disabled the use of cookies on their browser program), then the same steps as described above in blocks 138–146 are similarly executed. If in decision block 134 it is determined that a valid version is referenced in an HTTP cookie received from a client, then in a block 148 (equivalent to block 142, which was described above), the virtual directory containing the appropriate version of the hosted application is accessed, and the forms and scripts from the referenced virtual directory are used along with the back end tier SQL Instance hosting the client's database to provide a functional application to the client.

In a decision block 150, a check is performed to determine if the client's data actually can be found in the SQL Instance associated with the version referenced in the cookie. It is possible that the version referenced by the cookie is still a valid version (i.e., a version that is loaded on front end tier server 74), but that the client's database is not available in any SQL Instance corresponding to that version. This problem can occur if since the last visit of the client, the system administrator decided to migrate that client's data to a different SQL Instance and to update that client's corresponding version data in the provision SQL Instance. In some cases, after a client has been migrated to a different version of the hosted application, the prior version (likely still referenced in the client's cookies, as often the migration occurs between client visits) will be removed from the host servers, and then in decision block 134, the version would fail the existing test, requiring the correct version to be determined by using the provision SQL Instance as described above. If however, the administrator elected not to remove the old version (perhaps because other client data had not yet been migrated), then the version referenced in the client's HTTP request would still be a valid version. However, when an attempt is made to retrieve the client's database from an SQL Instance linked to the incorrect version (note that each SQL Instance is associated with only a single version), it will not be found, because it has been migrated to an SQL Instance associated with the new version. In such a case, the proper version will be determined using the provision SQL Instance as described in block 138. If at decision block 150, the client's database is found in the expected SQL Instance, then the client's data are processed using the appropriate virtual directory from the front end tier, and the required components from the proper SQL Instance in the back end tier. The client then can exit via block 146.

Figure 5:
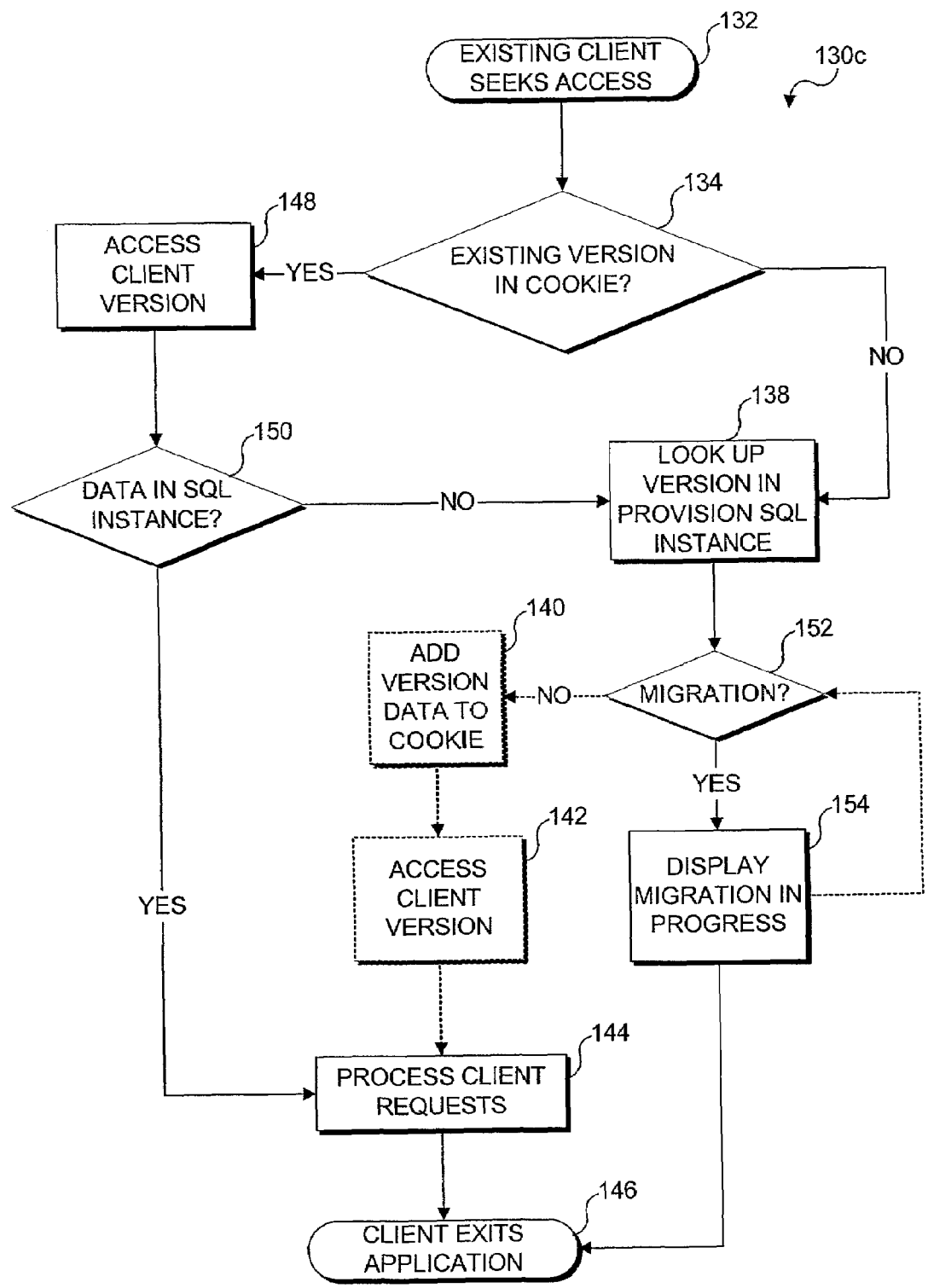
FIG. 5 is a flow chart diagram illustrating the logical steps implemented in accord with the present invention when an existing client seeks access to a server-hosted application, if more than one version of that server-hosted application resides on the server, and that client's data are unavailable because the data are currently being migrated.

The second potential scenario introduced above relates to an existing client that tries to access the hosted application during an upgrade, only to find out that their data are being migrated and are thus unavailable. Flowchart 130c of FIG. 5 illustrates the process followed in this case, which is very similar to those described above. In block 132, a client seeks access to the hosted application, and in decision block 134, the filter/diverter component intercepts the request at the front end tier and checks the request cookies for the software version number of the client. If the software version number is either not present or represents a version not supported by the host, the software version number and status of the company are obtained from the provision SQL Instance database in block 138. Part of the client information stored in provision SQL Instance is the status of the client. Whenever a client's database and version are being migrated, the status is changed to reflect that the client is currently being migrated. In a decision block 152, if it is determined that the status of the client is "migration in progress," a message is displayed to the client in a block 154 (for example, a "company is being migrated" web page can be displayed to such a client). Upon seeing such a message, a client can elect to exit the host via block 146, or alternatively (as indicated by the dashed line) occasionally refresh the browser program display to determine when the migration is completed. As noted above, other options are available during the migration of client data, such as allowing a client read-only access to their data, or some other limited access to their data. Such options would be more preferable as the time required for migration increases.

Referring back to decision block 134, if an existing version is identified in the client request cookie, that version is accessed in block 148. In decision block 150, if the related client data are found in the expected SQL Instance, the client is enabled to utilize the host application in block 144, until the client decides to exit in block 146. If in decision block 150, it is determined that the client data are not in the expected SQL Instance, the provision database is consulted in block 138, as discussed above.

Referring now to decision block 152, if it is determined that the client status does not indicate a migration is underway, the correct version is included in the HTTP response header (i.e., written into the client's cookie) in block 140, and the client is directed to the proper version in block 142. As before, the client is enabled to use the host application in block 144, until the client decides to exit in block 146. Blocks 140 and 142 have been shown in dashed lines, as flowchart 130c has been described as being the sequence of steps employed when a migration is in progress for a particular network client. It should be understood that flowcharts 130a–130e each illustrate specific logical steps employed in specific circumstances, rather than a high level flowchart for all of these circumstances.

There are many possible embodiments of the present invention in regard to details for how clients are migrated. Some embodiments will completely deny client access to the application and/or their data during migration. Other embodiments provide read only access to the client data during a migration. Another embodiment blocks client requests until the migration is complete. This approach is useful if the migration of a client takes very little time to complete; if the migration is sufficiently rapid, a client might simple believe that any perceived delay is due to normal Internet traffic. Yet another embodiment will queue the request until migration is completed. Those of ordinary skill in the art will recognize that these and other variations are possible within the scope of the present invention.

The third potential scenario introduced above relates to a new client who tries to provision themselves with the hosted application during a host upgrade. Flowchart 130d of FIG. 6 illustrates the process, which shares common steps with those processes described above and utilizes the same reference numbers, where appropriate. A new client attempts to access the hosted application in a block 132a. In a decision block 134a, the filter/diverter looks for a cookie in the new client request that includes a version number. Because this request is for a new client, there will be no cookie, and a decision block 156 determines whether any reference to the client exists in the provision database (provision SQL Instance 76 of FIG. 2). In a block 158, the host application's default version is assigned to the new client, and the new client's meta information (version, status, virtual directory, and database locations) are included in the provision database. In block 140, the version data are added to the cookie to eliminate the requirement for consulting the provision database each time the new client returns to run the hosted application. Of course, if a client has disabled cookies in their browser, the provision database will nevertheless need to be consulted to ensure the client is directed to the proper version. Next, the client is directed to the proper version in block 142, and as described above, the client is enabled to utilize the host application in block 144, until the client decides to exit in block 146.

The fourth potential scenario introduced above relates to a "tester" client who tries to provision themselves with the hosted application during a host upgrade. Flowchart 130e of FIG. 7 illustrates the process. As above, flowchart 130e shares some common steps with those processes described above, and the same reference numbers have been utilized where appropriate. A tester attempts to access the hosted application in a block 132b. In a block 160, the tester is directed to one of virtual directories 78 in servers 74 on front end tier 70 of system 60, as shown in FIG. 2. As noted above, virtual directories 78a contain scripts and forms related to the hosted application that are version independent. The tester is directed to a special tester page stored in the version independent virtual directories 78a. The special tester page adds a host defined tester default version to the tester's request cookie in a block 162. Thus in a decision block 134a, the filter/diverter determines that an existing version is included in the tester's request cookie. In a block 142a, the tester is directed to the virtual directory corresponding to the specified version. In a block 164, a tester database is defined for an SQL Instance associated with the specified version, and the tester meta data (version, status, database location) is written into the provision database. In a block 144a, the tester is enabled to use the host application, until the tester decides to exit in block 146a. Note that as used herein, the term "tester" can refer to someone who is testing the hosted application, special partners, or beta clients.

Even though the provision database (provision SQL Instance 76 of FIG. 2) includes client meta data, including a version identity, to enhance performance, the system preferably relies on cookies and filters to cache as much meta information as possible about the client accessing the hosted application. This step improves the performance of the system, since provisional database lookups are not performed for every request. Another important performance consideration is to invalidate "stale" cached cookies that incorrectly refer to a prior version after a particular client has been migrated to a new version.

Although the present invention has been described in connection with the preferred form of practicing it and modification thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method of migrating at least one client to a selected version of a server-hosted application on a network, where at least two different versions of the server-hosted application are available on the network, comprising the steps of:
   (a) installing the at least two different versions of the server-hosted application on the network, wherein the at least two different versions of the server-hosted application are not simply copies of a single release of the server-hosted application, but wherein each different version of the at least two different versions of the server-hosted application corresponds to a different release of the server-hosted application, each different release incorporating at least one modification relative to any other release of the server-hosted application;
   (b) creating a register identifying clients having access to the server-hosted application and indicating in the register which of the at least two different versions of the server-hosted application is associated with each client having access to the server-hosted application;
   (c) changing an association in the register of at least one client selected from those clients identified in the register to a different version of the at least two different versions of the server-hosted application; and
   (d) directing each client attempting to access the server-hosted application to the version corresponding to one of the at least two different versions of the server-hosted application with which the client is associated in the register.

2. The method of claim 1, wherein the register comprises meta information for each client.

3. The method of claim 2, wherein the meta information for each client includes a status of the client and a version identifier that indicates which of the at least two different versions of the server-hosted application is associated with the client.

4. The method of claim 3, wherein the meta information further comprises a location from where server-hosted application data of a client can be retrieved.

5. The method of claim 1, further comprising the step of grouping together version specific server-hosted application data into different data structures, such that at least one data structure exists for each of the at least two different versions of the server-hosted application, and each at least one data structure includes version specific server-hosted application data unique to only one of the at least two different versions of the server-hosted application.

6. The method of claim 1, further comprising the step of grouping together non version specific server-hosted application data into a single data structure.

7. The method of claim 1, further comprising the step of grouping together client specific server-hosted application data into different data structures based on the version of the server-hosted application that is associated with the client specific server-hosted application data, so that a different client data structure exists for each of the at least two different versions of the server-hosted application.

8. The method of claim 1, wherein the register comprises a separate data structure.

9. The method of claim 1, wherein the step of directing each client attempting to access the server-hosted application to the corresponding one of the at least two different versions of the server-hosted application associated with the client comprises the step of examining a request from each client for access to the server-hosted application to determine if the request contains a reference to the one of the at least two different versions of the server-hosted application with which the client making the request is associated.

10. The method of claim 9, wherein when a request from a client does not include a reference to which of the at least two different versions of the server-hosted application the client should be directed, further comprising the step of incorporating a reference to the one of the at least two different versions of the server-hosted application to which the client should be directed in a cookie returned to the client from the server, such that when the client makes a future request, the register does not need to be consulted to determine to which of the at least two different versions of the server-hosted application the client should be directed.

11. The method of claim 1, further comprising the step of examining a request from a client for access to the server-hosted application to determine if the request contains a reference to which of the at least two different versions of the server-hosted application the client should be directed, before consulting the register to determine to which of the at least two different versions of the server-hosted application the client is to be directed.

12. The method of claim 11, wherein when a request from a client does not include a reference to which of the at least two different versions of the server-hosted application the client should be directed, further comprising the step of incorporating a reference to the one of the at least two different versions of the server-hosted application to which the client should be directed in a cookie returned to the client from the server, such that when the client makes a future request, the register does not need to be consulted to determine to which of the at least two different versions of the server-hosted application the client should be directed.

13. The method of claim 1, wherein when a client attempts to access the server-hosted application and is not identified in the register, further comprising the steps of defining one of the at least two different versions of the server-hosted application as a default version of the server-hosted application, and associating the client with the default version of the server-hosted application; and, adding information identifying the client as being associated with the default version of the server-hosted application, to the register.

14. The method of claim 13, further comprising the step of incorporating a reference to the default version of the server-hosted application in a cookie returned to the client from the server, such that when that client makes a future request, the register does not need to be consulted to determine to which of the at least two different versions of the server-hosted application the client should be directed.

15. The method of claim 1, wherein when a client attempts to access the server-hosted application, and the request from the client includes a reference to the one of the at least two different versions of the server-hosted application to which the unique client should be directed, but that reference fails to define the one of the at least two different versions of the server-hosted application with which data of the client are associated, further comprising the step of consulting the register to determine to which of the at least two different versions of the server-hosted application the client should be directed.

16. The method of claim 15, further comprising the steps of changing the one of the at least two different versions of the server-hosted application contained in the request cookie to correspond with the one of the at least two different versions of the server-hosted application identified by the register, and returning the cookie that is thus corrected to the client, so that when the client makes a future request, the future request will properly reference the one of the at least two different versions of the server-hosted application with which the client is associated.

17. A machine-readable medium having machine instructions for performing the steps of claim 1.

18. A system for migrating at least a portion of a plurality of clients to a specific unique version of a server-hosted application on a network to which the plurality of clients is coupled, where at least two unique versions of the server-hosted application are available on the network, comprising:

(a) a computing device for each client coupled to the network; and (b) a server having a processor and a memory in communication with the processor, said memory storing machine instructions that when executed by the processor, cause the processor to:

(i) install the at least two unique versions of the server-hosted application for access over the network, wherein the at least two unique versions are not simply identical copies of a single release of the server-hosted application, but each of the at least two unique versions of the server-hosted application corresponds to a different release of the server-hosted application, each different release including at least one modification relative to any other release of the server-hosted application;

(ii) create a register identifying the plurality of clients having access to the server-hosted application and including an association of a specific one of the at least two unique versions of the server-hosted application with each client having access to the server-hosted application;
- (iii) change an association in the register of a first group of clients selected from the plurality of clients, to a different one of the at least two unique versions of the server-hosted application; and
- (iv) direct each client attempting to access the server-hosted application to the specific one of the at least two unique versions of the server-hosted application with which the client is associated in the register.

19. The system of claim 18, wherein the machine instructions, when executed by the processor, further cause the processor to direct each client attempting to access the server-hosted application to the specific one of the at least two unique versions of the server-hosted application with which the client is associated, by consulting the register to determine the specific one of the at least two unique versions of the server-hosted application to which the client should be directed.

20. The system of claim 18, wherein the machine instructions, when executed by the processor, further cause the processor to direct each client attempting to access the server-hosted application to the specific one of the at least two unique versions of the server-hosted application with which the client is associated, by examining a request from each client to the server to determine if the request contains a reference to the specific one of the at least two unique versions of the server-hosted application to which the client should be directed.

21. The system of claim 20, wherein when the request does not include a reference to the specific one of the at least two unique versions of the server-hosted application to which the client should be directed, the machine instructions cause the processor to identify the specific one of the at least two unique versions of the server-hosted application to which the client should be directed, by consulting the register.

22. The system of claim 21, wherein when the request does not include a reference to the specific one of the at least two unique versions of the server-hosted application to which the client should be directed, the machine instructions further cause the processor to incorporate a reference to the specific one of the at least two unique versions of the server-hosted application to which the client should be directed in a cookie returned to the client from the server, such that when the client makes a future request, the register does not need to be consulted to determine to which specific one of the at least two unique versions of the server-hosted application the client should be directed.

23. The system of claim 18, wherein when a client attempts to access the server-hosted application, and the client is not identified in the register, the machine instructions further cause the processor to define one of the at least two unique versions of the server-hosted application as a default version of the server-hosted application, and to associate the client with the default version of the server-hosted application, and add the client in association with the default version of the server-hosted application, to the register.

24. A method of enabling a provider of a server-hosted application accessible via a network to migrate selected clients from a first version of said server-hosted application to a second version of said server-hosted application, such that at least one of the first version of the server-hosted application and the second version of the server-hosted application remains accessible to at least some clients of the network during the migration, comprising the steps of:
- (a) creating a register identifying each client having access to the server-hosted application, and associating each client having access to the server-hosted application with the first version of the server-hosted application, wherein the first version of the server-hosted application is already installed on the network, and wherein the first version of the server-hosted application and the second version of the server-hosted application are not simply copies of a specific release of the server-hosted application, but rather the first version of the server-hosted application and the second version of the server-hosted application are different releases of the server-hosted application, each different release of these server-hosted application including at least one modification relative to any other release of the server-hosted application;
- (b) making the second version of the server-hosted application available on the network;
- (c) selecting a first group of clients from those clients identified in the register to be migrated to the second version of the server-hosted application;
- (d) changing the register so that the register indicates each client included in the first group of clients is associated with and allowed to access the second version of the server-hosted application, but not the first version of the server-hosted application;
- (e) each time that a client attempts to access the server-hosted application, automatically identifying which one of the first version of the server-hosted application and the second version of the server-hosted application that said client is allowed to access; and
- (f) automatically directing said client to the one of the first version of the server-hosted application and the second version of the server-hosted application that the client is allowed to access.

25. The method of claim 24, wherein the register comprises meta information for each client, said meta information including at least a status of each client and a version identifier that identifies which of the first version of the server-hosted application and the second version of the server-hosted application that the client is allowed to access.

26. The method of claim 25, wherein the status comprises at least one of an active state and a being migrated state.

27. The method of claim 26, wherein when data of any of the first group of clients must be reformatted to be compatible with the second version of the server-hosted application, for each client in the first group of clients whose data requires reformatting, further comprising the steps of:
- (a) modifying the register to identify the status of the client as in the being migrated state;
- (b) reformatting the data associated with the client to be compatible with the second version of the server-hosted application; and
- (c) when the reformatting is completed, modifying the register to identify the status of the client as being in the active state.

28. The method of claim 27, wherein if an error occurs in reformatting the data associated with the client, further comprising the steps of:
- (a) modifying the register to identify the status of the client as in the being migrated state;
- (b) reformatting the data associated of the client to be compatible with the first version of the server-hosted application; and (c) when the reformatting is completed:
  (i) modifying the register to identify the status of the client as in the active state; and
  (ii) changing the register so that the register indicates the client is associated with and allowed to access the first version of the server-hosted application, but not the second version of the server-hosted application.

29. The method of claim 26, further comprising the step of determining the status of each client attempting to access the server-hosted application, and if the status of the client is identified as being migrated, preventing the client from accessing the server-hosted application, until the status of the client is changed to the active state.

30. The method of claim 26, further comprising the step of determining the status of each client attempting to access the server-hosted application, and if the status of the client is identified as being migrated, allowing the client only limited access to the server-hosted application, until the status of the client is changed to the active state.

31. The method of claim 26, further comprising the step of determining the status of each client attempting to access the server-hosted application, and if the status of the client is identified as being migrated, allowing the client only limited access to the client's data stored by the server-hosted application, until the status of the client is changed to the active state.

32. The method of claim 24, further comprising the step of making the first version of the server-hosted application unavailable to the network, if each client identified in the register as having access to the server-hosted application, is associated with the second version of the server-hosted application.

33. The method of claim 24, wherein the step of automatically identifying the version of the server-hosted application that said client is allowed to access comprises the step of consulting the register to determine the version of the server-hosted application that said client is allowed to access.

34. The method of claim 24, wherein the step of automatically identifying the version of the server-hosted application that said client is allowed to access comprises the step of examining a request from said client to the server, to determine if the request contains a reference to which one of the first version of the server-hosted application and the second version of the server-hosted application that said client is allowed to access.

35. The method of claim 34, wherein if the request does not include the reference to which of the first version of the server-hosted application and the second version of the server-hosted application that said client is allowed to access, the step of automatically identifying which of the first version of the server-hosted application and the second version of the server-hosted application that said client is allowed to access comprises the step of consulting the register to determine which of the first version of the server-hosted application and the second version of the server-hosted application that said client is allowed to access.

36. The method of claim 34, wherein if the request does not include any reference to the version of the server-hosted application that said client is allowed to access, further comprising the step of incorporating a reference to the version of the server-hosted application that said client is allowed to access in a cookie returned to said client from the server, such that when said client makes a future request, the register does not need to be consulted to determine the version of the server-hosted application.

37. The method of claim 24, wherein when said client is not identified in the register, further comprising the steps of defining one of the first version of the server-hosted application and the second version of the server-hosted application as a default version of the server-hosted application, associating said client with the default version of the server-hosted application, and updating the register to identify said client and to indicate that said client is allowed to access the default version of the server-hosted application.

38. The method of claim 37, wherein said default version is the first version of the server-hosted application.

39. The method of claim 37, wherein said default version is the second version of the server-hosted application.

40. The method of claim 37, further comprising the step of incorporating a reference to the default version of the server-hosted application that said client is allowed to access in a cookie returned to said client from the server, such that when said client makes a future request, the register does not need to be consulted to determine which of the first version of the server-hosted application and the second version of the server-hosted application that said client is allowed to access.

41. The method of claim 24, wherein when a request from said client to access the server-hosted application includes a reference to the one of the first version of the server-hosted application and the second version of the server-hosted application that said client is allowed to access, but the reference fails to indicate the one of the first version of the server-hosted application and the second version of the server-hosted application with which data of said client are associated, the step of automatically identifying the one of the first version of the server-hosted application and the second version of the server-hosted application comprises the step of consulting the register to determine which of the first version of the server-hosted application and the second version of the server-hosted application that said client is allowed to access.

42. The method of claim 41, further comprising the steps of:
  (a) changing the reference in the request to correspond to the one of the first version of the server-hosted application and the second version of the server-hosted application that said client is allowed to access that is defined in the register; and
  (b) returning the changed reference to said client, such that when said client makes a future request, said future request properly references the one of the first version of the server-hosted application and the second version of the server-hosted application that said client is allowed to access.

43. The method of claim 24, further comprising the steps of selecting a second group of clients from those clients identified in the register that are allowed to access the first version of the server-hosted application, and changing the register so that the register indicates each client included in the second group of clients is associated with and allowed to access the second version of the server-hosted application, but not the first version of the server-hosted application.

44. The method of claim 43, wherein when all clients identified in the register are associated with and only allowed access to the second version of the server-hosted application, further comprising the step of making the first version of the server-hosted application unavailable to the network.

45. A machine-readable medium having machine instructions for performing the steps of claim 24.

46. A system for enabling a provider of a server-hosted application to migrate at least some clients from a first version of the server-hosted application to a second version of the server-hosted application, such that at least one version of the server-hosted application remains accessible to at least some of the clients during the migration, comprising:
 (a) a plurality of computing devices, each computing device comprising a different client; and
 (b) a server having a processor and a memory in communication with the processor, said memory storing machine instructions that when executed by the processor, cause the processor to:
  (i) maintain a register that identifies each client having access to the server-hosted application, for each client having access to the server-hosted application, associates the client with the first version of the server-hosted application, wherein the first version of the server-hosted application and the second version of the server-hosted application are not simply copies of a single release of the server-hosted application, but instead, the first version and the second version of the server-hosted application correspond to different releases of the server-hosted application, each different release of the server-hosted application including at least one modification relative to any other release of the server-hosted application;
  (ii) enable the first version of the server-hosted application and the second version of the server-hosted application to be made available to the clients at the same time;
  (iii) enable a first group of clients to be selected from those clients identified in the register, for migration to the second version of the server-hosted application;
  (iv) change the register so that the register indicates that each client included in the first group of clients is associated with and allowed to access the second version of the server-hosted application, but not the first version of the server-hosted application;
  (v) each time that any client attempts to access the server-hosted application, automatically identify which of the first version of the server-hosted application and the second version of the server-hosted application that said client is allowed to access; and
  (vi) direct said client to the one of the first version of the server-hosted application and the second version of the server-hosted application that said client is allowed to access.

47. A method of migrating at least one client to a selected version of a server-hosted application on a network, comprising the steps of:
 (a) installing a first version of the server-hosted application and a second version of the server-hosted application on the network, the first version of the server-hosted application and the second version of the server-hosted application corresponding to different releases of the server-hosted application, each different release of the server-hosted application incorporating at least one change relative to any other release of the server-hosted application, wherein each release of the server-hosted application is configured to execute processing remote from the client, and to transmit a result to the client, wherein the server-hosted application could have been executed by the client, if the server-hosted application resided on the client instead of on the network hosting the server-hosted application, even if the client did not have access to the network;
 (b) creating a register identifying clients having access to the server-hosted application and indicating in the register which of the first version of the server-hosted application and the second version of the server-hosted application is associated with each client having access to the server-hosted application;
 (c) changing an association in the register of at least one client selected from those clients identified in the register to a different one of the first version of the server-hosted application and the second version of the server-hosted application; and
 (d) directing each client attempting to access the server-hosted application to the one of the first version of the server-hosted application and the second version of the server-hosted application with which the client is associated in the register.

48. A method of enabling a provider of a server-hosted application to replace a first version of said server-hosted application with a second version of said server-hosted application, comprising the steps of:
 (a) creating a register identifying each client having access to the server-hosted application, and associating each client having access to the server-hosted application with the first version of the server-hosted application;
 (b) making the second version of the server-hosted application available on the network, wherein the first version of the server-hosted application and the second version of the server-hosted application correspond to different releases of the server-hosted application, each different release of the server-hosted application incorporating at least one change relative to any other release of the server-hosted application;
 (c) selecting a first group of clients from those clients identified in the register to be migrated to the second version of the server-hosted application;
 (d) changing the register so that the register indicates each client included in the first group of clients is associated with and allowed to access the second version of the server-hosted application, but not the first version of the server-hosted application;
 (e) each time that a client attempts to access the server-hosted application, automatically identifying the version of the server-hosted application that said client is allowed to access;
 (f) automatically directing said client to the version of the server-hosted application that the client is allowed to access; and
 (g) once all of the clients of the server-hosted application have been migrated to the second version of the server-hosted application, removing the first version of the server-hosted application from the network, thereby replacing the first version of the server-hosted application with the second version of the server-hosted application.

\* \* \* \* \*